UNITED STATES PATENT OFFICE.

JACOB S. LOWE, OF GENEVA, OHIO, ASSIGNOR OF ONE-HALF TO WILLIAM B. THOMPSON, OF DETROIT, MICHIGAN.

PROCESS OF MAKING CRAYONS.

SPECIFICATION forming part of Letters Patent No. 301,137, dated July 1, 1884.

Application filed January 10, 1884. (Specimens.)

*To all whom it may concern:*

Be it known that I, JACOB S. LOWE, of Geneva, in the county of Ashtabula and State of Ohio, have invented a new and useful Improvement in Processes of Making Crayons, of which the following is a specification.

The objection to crayons as now made is that they soil the fingers and clothes of the users unless coated with paper or some other clean substance.

My invention consists in a mode of manufacturing crayons by which the outer surface is made so smooth and polished as to be free from this objection. To do this I take a metal block as thick as the length of the crayon to be made, through which is made one or more dies with smooth surfaces of the size and shape of the crayon to be made. This block is laid on a bed-plate to close one end of the dies; and the composition of which the crayons are made is forced in a plastic state and under pressure into the dies, so as to completely fill the same. The composition is now allowed to set or harden until it becomes stiff enough to be handled without breaking, the time necessary for this varying somewhat with the composition used, and the crayon or crayons are then expelled from the die or dies by a plunger or plungers and dried in a kiln, or any suitable manner.

The operations of forcing the plastic composition into a smooth die and then forcing the crayon out of the die after it has partially set or hardened, render the surface of the crayon so hard and give it such a brilliant polish that the finished crayon can be used without danger of soiling the fingers.

The dies can be made of any metal; but I prefer Babbitt metal, as being the least liable to rust.

It is evident that the dies can be made of any size or shape, and that they can be made in any of the known ways instead of being cut through a solid metal block.

What I claim as my invention, and desire to secure by Letters Patent, is —

The herein-described mode of manufacturing crayons, consisting in forcing the composition of which the crayons are made while in a plastic state into a die having smooth sides, allowing the same to partially harden or set, and then expelling the crayon from the die by pressure.

JACOB S. LOWE.

Witnesses:
 W. E. MORGAN,
 A. J. TRUNKEY.